United States Patent [19]

Hakamada et al.

[11] Patent Number: 5,247,365
[45] Date of Patent: Sep. 21, 1993

[54] CHANNEL-SCANNING PICTURE-IN-PICTURE-IN-PICTURE TELEVISION RECEIVER

[75] Inventors: Kunio Hakamada, Saitama; Yoshinori Komiya, Kanagawa, both of Japan

[73] Assignee: Sony Corporation, Tokyo, Japan

[21] Appl. No.: 861,015

[22] Filed: Mar. 31, 1992

[30] Foreign Application Priority Data

Apr. 12, 1991 [JP] Japan ................... 3-108577

[51] Int. Cl.$^5$ ............................... H04N 5/50
[52] U.S. Cl. ................... 358/193.1; 358/183; 358/22
[58] Field of Search .......... 358/188, 183, 22 PIP, 358/193.1, 191.1, 181

[56] References Cited

U.S. PATENT DOCUMENTS

| | | | |
|---|---|---|---|
| 4,623,915 | 11/1986 | Bolger | 358/22 PIP |
| 4,774,582 | 9/1988 | Hakamada et al. | 358/183 |
| 5,045,946 | 9/1991 | Yu | 358/191.1 |
| 5,047,867 | 9/1991 | Strubbe et al. | 358/183 X |
| 5,144,938 | 9/1992 | Kim | 358/193.1 X |

*Primary Examiner*—Victor R. Kostak
*Attorney, Agent, or Firm*—Lewis H. Eslinger; Jay H. Maioli

[57] ABSTRACT

A television receiver is adapted for displaying, in superimposition on a master picture of a channel received by a first tuner, a slave picture of a channel received by a second tuner. The television receiver includes a scanner key for scanning the channel received by the second tuner, a return key for terminating the scanning and a controlling circuit responsive to the operation of the scanner key and the return key for selecting the channel to be received by a receiving circuit. The scanner key is operated to scan the channels received by the second tuner and the return key is operated to terminate the channel scanning to select a desired channel to be received.

6 Claims, 2 Drawing Sheets

CHANNEL-SCANNING PICTURE-IN-PICTURE-IN-PICTURE TELEVISION RECEIVER

BACKGROUND OF THE INVENTION

1. Field of the Invention

This invention relates to a television receiver. More particularly, it relates to a television receiver in which a slave picture, a small picture of a channel other than a channel currently received by the receiver, is displayed in superimposition on a master picture, a large picture displaying the channel currently received by the receiver, so that the viewer may retrieve and select a desired reception channel as he views an image displayed as the slave picture.

2. Description of the Related Art

Recently, a television receiver in which a small picture may be displayed simultaneously on a larger picture (picture-in-picture), is becoming popular. With such system of the television receiver, it is possible for the viewer to display the small picture or the slave picture of a desired channel as he views the large picture or the master picture and to change over the channel of the slave picture to find the channel broad casting a program which is most interesting to him. Once the interesting program is found, the viewer may change over the slave picture to the master picture to view the program of the selected channel as the master picture.

meanwhile, the following two methods have been heretofore used for sequentially changing over the channels of the slave pictures. With the first method, the channels of the slave pictures may be sequentially switched by operating a predetermined key. With the second method, the channels are automatically changed over by operating a predetermined key once and the channel changing over operation is discontinued on reversion to the original channel, that is the channel at which channel changing over is initiated.

With the first method, it is necessary to press the predetermined key continuously until the desired channel is found.

With the second method, the channel selecting operation cannot be stopped at a desired position, such that the user is obliged to memorize or note down the channel broad casting an interesting program to select the channel after the end of the changing over operation.

OBJECT AND SUMMARY OF THE INVENTION

It is an object of the present invention to provide a television receiver in which an image of a channel other than the currently selected channel is displayed as a slave picture displayed in superimposition on a master picture so that it is possible for the viewer to retrieve a desired reception channel as he views the pictures to enable facilitated channel selection.

The present invention provides a television receiver adapted for displaying, in superimposition on a master picture of a channel received by a first tuner, a slave picture of a channel received by a second tuner. The television receiver includes a scanner key for scanning the channels received by the second tuner, a return key for terminating the scanning and a controlling circuit responsive to the operation of the scanner key and the return key for selecting the channel to be received by a receiving circuit. The scanner key is operated to scan the channels received by the second tuner and the return key is operated to terminate the channel scanning to select a desired channel to be received.

Other objects and advantages of the present invention will become more apparent from reading the following description and the appended claims.

DESCRIPTION OF THE PREFERRED EMBODIMENT

Figure 1:
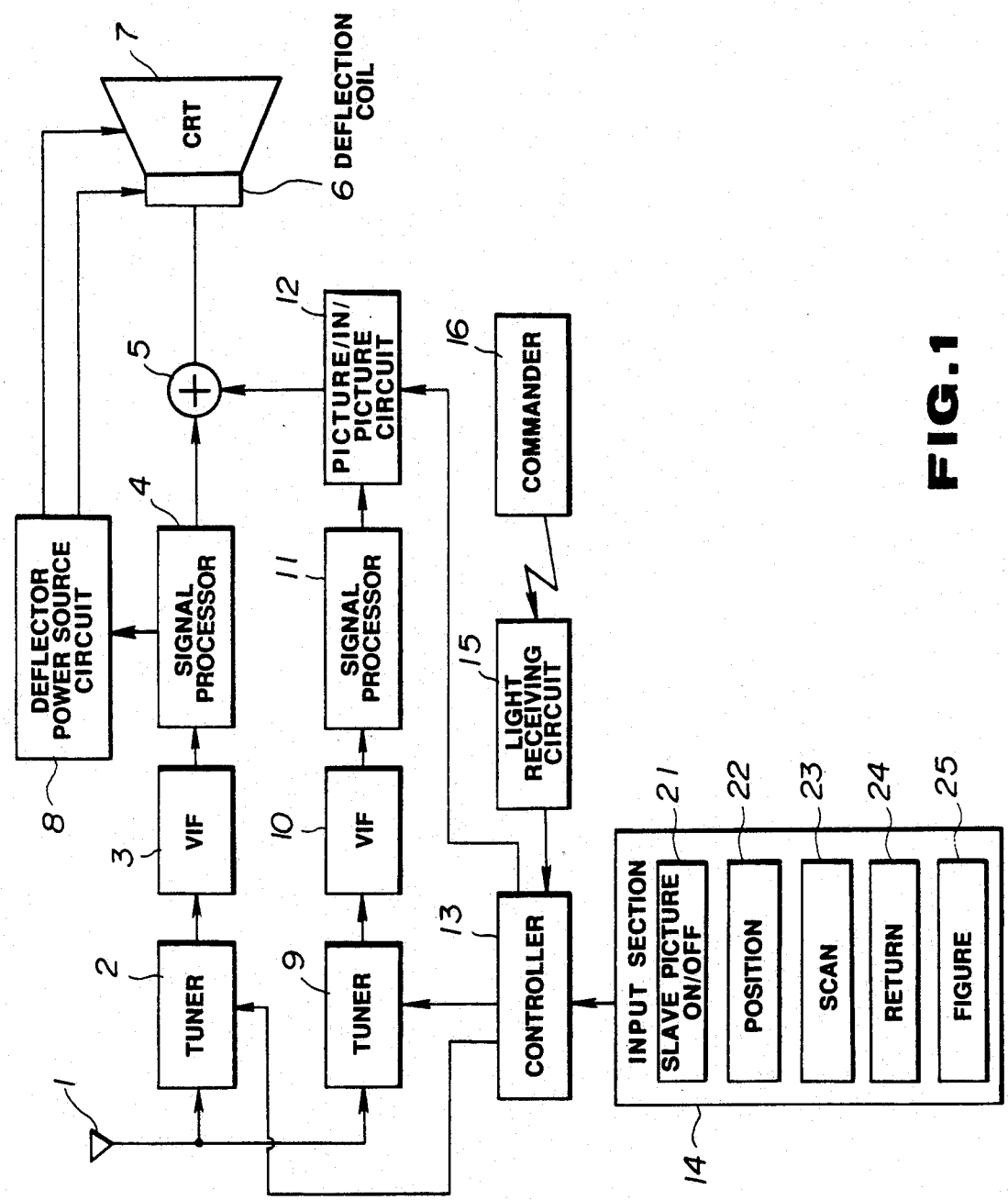
FIG. 1 is a block circuit diagram showing a television receiver according to the present invention.

The construction of a television receiver according to the present invention will be explained by referring to FIG. 1.

The television receiver has a first tuner 2 and a second tuner 9 both supplied with an output of an antenna 1. An output from the first tuner 2 is supplied to a first VIF circuit 3, an output of which is supplied to a first signal processor 4. An output of the first signal processor 4 is supplied to a summing point 5.

Similarly, an output of the second tuner 9 is supplied to a second VIF circuit 10, an output of which is supplied to a second signal processing circuit 11. An output of the second signal processing circuit 10 is supplied to a picture-in-picture circuit 12, an output of which is supplied to the summing point 5.

The summing point 5 sums the output from the first signal processing circuit 4 and the output of the picture-in-picture circuit 12 together to transmit a sum signal to a CRT 7. A synchronizing signal outputted from the first signal processing circuit 4 is supplied to a deflection power source circuit 8, which is synchronized with the synchronizing signal to control a deflection coil 6 as well as to supply a predetermined high voltage to CRT 7.

A controlling circuit 13 is constituted by, for example, a microcomputer, and is adapted for controlling various components responsive to an input from an input section 14, which is made up of a slave picture on/off key 21, a position key 22, a scanner key 3, a return key 24 and a numeral key. A commander 16 has the same types of keys as those of the input section 14, and is adapted for supplying an infrared signal associated with the operated key to a light receiving circuit 15, which is adapted for receiving the infrared light from the commander 16 for outputting the signal corresponding to the received IR signal to the controlling circuit 13.

In operation, when the numeral key 25 is operated to select and enter a channel to be received, the controlling circuit 13 controls the tuner 2 to receive the channel associated with the input. The tuner 2 receives the signals of the selected channel via an antenna 1 to convert the signals into intermediate frequency signals (IF signals) which are outputted to the VIF circuit 3. The VIF circuit 3 separates the input IF signals into video signals and audio signals to output the video signals to the signal processing circuit 4.

Although not shown, a similar processing circuit is provided for audio signals so that signals processed thereby may be outputted to a speaker.

The first signal processing circuit 4 demodulates the input video signals to transmit demodulated signals as R, G and B signals to CRT 7 via summing point 5. An image of the designated channel is displayed in this manner on CRT 7.

If a slave picture on/off key 21 is operated to command a slave picture to be turned on, a slave picture, herein a slave picture A, is displayed in a master picture. That is, signals of a predetermined channel received via antenna 1 by the second tuner 9 are transmitted at this time to the second VIF circuit 10, which separates video signals from the IF signals inputted from the second tuner 9 to transmit the separated video signals to the second signal processor 11. The second signal processing circuit 11 generates R, G and B signals from input video signals to output these signals to the picture-in-picture circuit 12.

Figure 2:
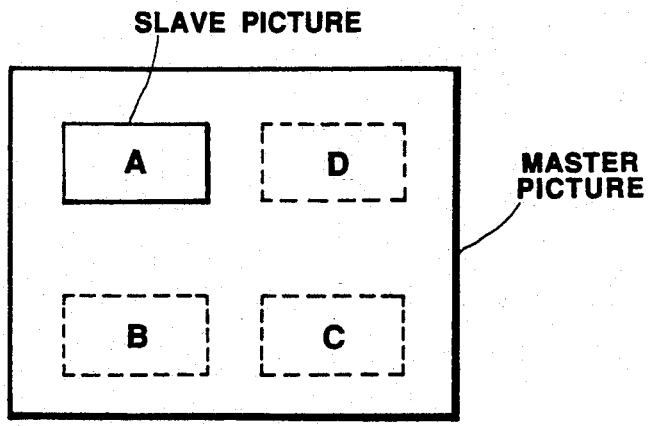
FIG. 2 shows the relation between a master picture and a slave picture displayed on a CRT of a television receiver according to the present invention.

The picture-in-picture circuit 12 has an internal memory in which the video data supplied from the signal processing circuit 11 are transiently stored. These video data are diluted at a predetermined rate to generate video data of a reduced size which data are outputted to the summing point 5. In this manner, the slave picture received by the tuner 9 may be displayed in superimposition on the master picture received by the tuner 2, as indicated in FIG. 2.

The numeral key 25 may be operated for suitably selecting and designating the channel displayed as the slave picture.

If the slave picture on/off key 21 is again operated for commanding the slave picture to be turned off, the controlling circuit 13 controls the second tuner 9 and the picture-in-picture circuit 12 to quit display of the slave picture. In this manner, only the master picture is displayed on CRT 7.

If the position key 22 is operated while the slave picture is displayed, the position of the slave picture is changed from A to B, thence to C, thence to D and thence again to A, each time the position key 22 is operated. In this manner, the slave picture may be displayed at the desired position.

Figure 3:
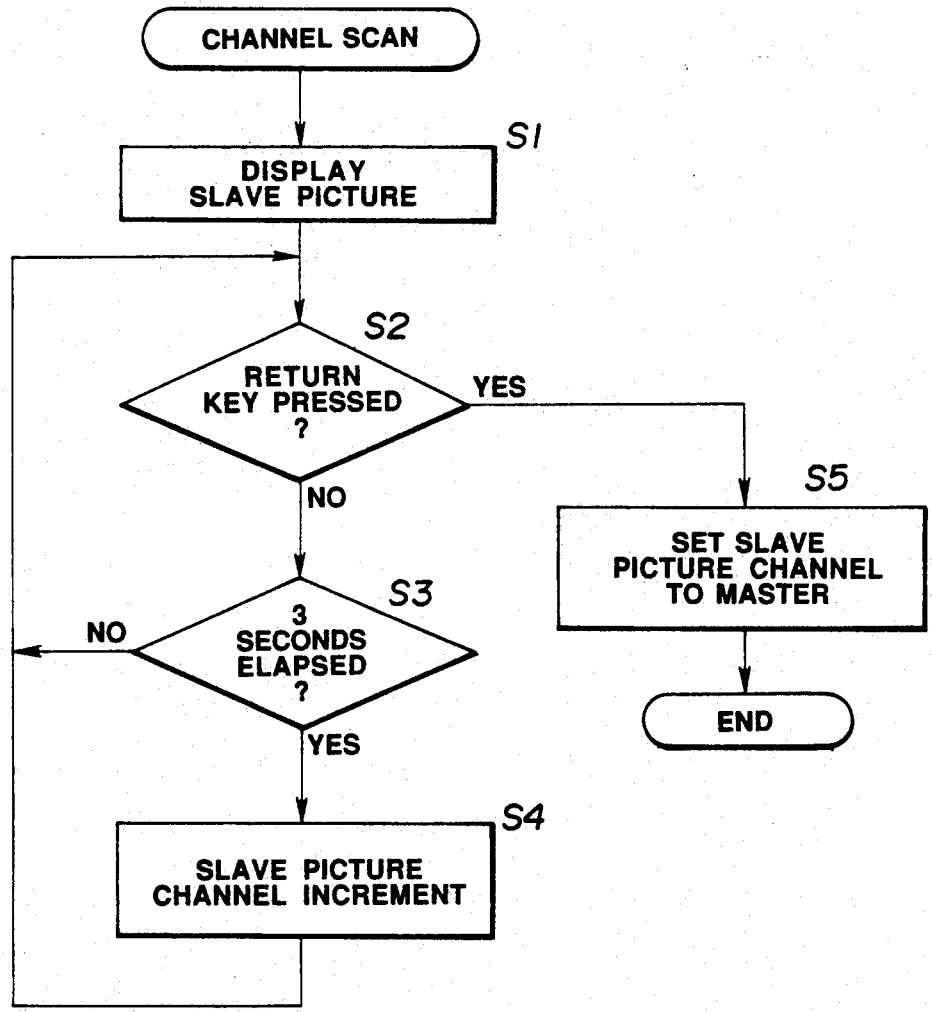
FIG. 3 is a flowchart for illustrating the operation of selecting a reception channel of a television receiver according to the present invention.

If then the scanner 23 is operated, the controlling circuit 13 executes a processing operation as shown in a flowchart of FIG. 3. First, at step S1, the slave picture is displayed in superimposition on the master picture. In the case of the Tokyo district, for example, one of 1, 3, 4, 6, 8, 10 and 12 channels is set as a channel first displayed on the slave picture.

The controlling circuit 13 then proceeds to step S2 to check if return key 24 is actuated. If the return key 24 is not actuated, the controlling circuit proceeds to step S3 to check if 3 seconds have elapsed since the slave picture is displayed. If 3 seconds have not elapsed, controlling circuit 13 reverts to step S2 to check if the return key 24 is actuated. If the return key 24 is not operated before lapse of 3 seconds, system controller proceeds to step S4 to change over the channel of the slave picture in an incrementing direction.

In the case of the Tokyo district, the channel is changed over to a larger numeral channel among the above-mentioned channels 1, 3, 4, 6, 8, 10 and 12. Channel 1 is selected after channel 12. Since none of the channels 2, 5, 7, 9 or 11 is allocated to telecasting stations, these channels are not selected during the scanning mode. In this manner, noise pictures may be prevented from being displayed as the slave picture each time vacant channels are selected.

Thus the images of the respective channels are sequentially displayed as slave pictures at an interval of 3 seconds. The viewer operates the return key 24 when the image displayed as the slave picture is the image he desires to view among the sequentially displayed slave pictures. At this time, controlling circuit 13 proceeds from step S2 to step S5 to change over the channel displayed as the slave picture into the master picture. That is, when the return key 24 is operated, the controlling circuit 13 causes the channel received by the tuner 9 to be received by the tuner 2, while causing the display of the slave picture to cease. In this manner, the image of the designated channel is displayed as a master picture on CRT 7.

Although the return key 24 is provided besides the scanner key 3 as a key for discontinuing the scanning operation, the scanning operation may also be discontinued on actuation of the scanner 23 again during execution of the scanning operation, in which case the return key 24 may be omitted.

In addition, the reception channel of the master picture may also be scanned instead of scanning the channels of the slave picture, as described in the foregoing.

What is claimed is:

1. A television receiver comprising a first tuner and a second tuner each adapted for receiving video signals of a plurality of predetermined channels, an image of the channel received by said first tuner being displayed as a larger picture and an image of the channel received by said second tuner being displayed as a small picture within said larger picture, further comprising
   first operating means operated for automatically and repetitively scanning said plurality of channels received by one of said first and second tuners,
   second operating means operated for terminating said scanning,
   whereby said plurality of channels are sequentially displayed for a predetermined time period after a single operation of said first operating means and until operation of said second operating means, and
   a controlling circuit for selecting the channel received by said one of said first and second tuners responsive to the operation of said first and second operating means.

2. A television receiver according to claim 1 wherein said one of the first and the second tuners is the second tuner adapted for receiving image signals of the channel displayed as a small picture in superimposition in a large picture of the channel received by the first tuner.

3. A television receiver according to claim 1 wherein said first and the second operating means are provided with the same sets of operating keys.

4. A television receiver according to claim 1 further comprising a slave picture on/off key for controlling an output of said second tuner receiving image signals of the channel displayed as a small picture in superimposition in the large picture displaying the image of the channel received by the first tuner.

5. A television receiver according to claim 1 further comprising means for changing over the display position of said small picture displayed in superimposition on said large picture.

6. A television receiver according to claim 1 wherein scanning of the received channels is sequentially changed over from a channel bearing a larger figure to a channel bearing a smaller figure.

* * * * *